United States Patent
Sugimoto et al.

(10) Patent No.: US 8,892,522 B2
(45) Date of Patent: Nov. 18, 2014

(54) MAP INFORMATION MANAGEMENT SYSTEM AND MAP INFORMATION DISTRIBUTION SYSTEM

(75) Inventors: Hironobu Sugimoto, Toyota (JP); Sadahiro Koshiba, Okazaki (JP); Kazuteru Maekawa, Okazaki (JP); Masahiro Tsujiko, Okazaki (JP); Koji Uchiyama, Okazaki (JP); Yoshikatsu Matsumoto, Nagoya (JP); Kaname Miyazaki, Nagoya (JP); Kenji Yano, Kitakyushu (JP); Yuichi Ochi, Kitakyushu (JP)

(73) Assignees: Zenrin Co., Ltd., Kitakyushu-shi (JP); Toyota Jidosha Kabushiki Kaisha, Toyota-shi (JP); Toyota Mapmaster Inc., Nagoya-shi (JP); Aisin AW Co., Ltd., Anjo-shi (JP)

( * ) Notice: Subject to any disclaimer, the term of this patent is extended or adjusted under 35 U.S.C. 154(b) by 899 days.

(21) Appl. No.: 12/311,746

(22) PCT Filed: Oct. 2, 2007

(86) PCT No.: PCT/JP2007/069284
§ 371 (c)(1),
(2), (4) Date: Apr. 10, 2009

(87) PCT Pub. No.: WO2008/044547
PCT Pub. Date: Apr. 17, 2008

(65) Prior Publication Data
US 2010/0011022 A1 Jan. 14, 2010

(30) Foreign Application Priority Data

Oct. 12, 2006 (JP) ................................ 2006-278579

(51) Int. Cl.
*G06F 17/30* (2006.01)
*G09B 29/10* (2006.01)
*G01C 21/32* (2006.01)

(52) U.S. Cl.
CPC .............. *G01C 21/32* (2013.01); *G09B 29/10* (2013.01)
USPC ...................................................... 707/661

(58) Field of Classification Search
None
See application file for complete search history.

(56) References Cited

U.S. PATENT DOCUMENTS

| | | | | |
|---|---|---|---|---|
| 4,937,572 A | * | 6/1990 | Yamada et al. | 340/995.18 |
| 5,953,722 A | * | 9/1999 | Lampert et al. | 701/461 |
| 6,453,233 B1 | * | 9/2002 | Kato | 701/451 |
| 7,099,882 B2 | * | 8/2006 | McDonough | 340/990 |
| 2002/0087263 A1 | * | 7/2002 | Wiener | 701/207 |
| 2003/0028315 A1 | * | 2/2003 | Miyahara | 701/208 |
| 2004/0135705 A1 | | 7/2004 | Umezu et al. | |
| 2006/0095202 A1 | * | 5/2006 | Atarashi et al. | 701/208 |
| 2006/0293845 A1 | * | 12/2006 | Watanabe | 701/208 |

FOREIGN PATENT DOCUMENTS

| | | |
|---|---|---|
| JP | 11-258981 | 9/1999 |
| JP | 2002-296042 | 10/2002 |
| JP | 3391171 | 1/2003 |
| JP | 2004-191419 | 7/2004 |
| JP | 2004-212273 | 7/2004 |
| JP | 2004-318220 | 11/2004 |
| JP | 2005-258340 | 9/2005 |
| JP | 2006-126683 | 5/2006 |

OTHER PUBLICATIONS

International Search Report.
Japanese Office Action with English translation dated Dec. 25, 2007.
Supplementary European Search Report issued for European Patent Application No. 07829024.4 on Feb. 17, 2014.

* cited by examiner

Primary Examiner — Rehana Perveen
Assistant Examiner — Hung Havan
(74) Attorney, Agent, or Firm — Kratz, Quintos & Hanson, LLP

(57) ABSTRACT

There is provided a map information providing technology that can keep map information very fresh at all times.

A map information management system has a map to be updated DB for storing map data to be updated that is used to update and maintenance, a map to be provided DB for storing map data to be provided that is distributed, an updated data DB for storing updated data for updating the map data to be provided, a map DB update means for updating the map data to be updated when the updated data for updating the map data of the map data to be updated DB is input, an updated data creation mean for creating the differential data before and after it is updated by the updated data and storing the differential data in the updated data DB as the updated data, and a data distribution means for extracting the map data to be provided or the updated data stored in the map to be provided DB when it receives a request to distribute the map data or the updated data from a destination system and distributing it to the destination system.

15 Claims, 11 Drawing Sheets

(a)

(b)

(c)

MAP INFORMATION MANAGEMENT SYSTEM AND MAP INFORMATION DISTRIBUTION SYSTEM

TECHNICAL FIELD

The present invention relates to a digital map information distribution system.

BACKGROUND ART

Map information used in a map information system (GIS) and the like is provided in a format managed by mesh and layer. In general, map information becomes obsolete as a time passes because planimetric features (buildings, roads, rail roads, and the like) are newly constructed, broken and removed, and modified, or a landform is changed by construction and a natural phenomenon. Accordingly, it is necessary to periodically update the map information. In many cases, the map information is updated using a map information distribution system.

A map information distribution system disclosed in Patent Document 1 is known as a conventional map information distribution system. FIG. 10 is a view showing an overall arrangement of the map information distribution system disclosed in Patent Document 1. The map information distribution system is arranged by connecting a map information management system 100, which updates, manages, and distributes map information, to a server 105 of a destination, which is located in the destination of map information, and to an information communication terminal 106 of the destination through a network 104.

The map information management system 100 is composed of a transmission system 101 and a reception system 102 which are connected to each other through a communication line 103. Further, the server 105 of the destination and the information communication terminal 106 of the destination are connected to the transmission system 101 through the network 104.

The transmission system 101 is a system which is installed on a vender side of the map information and transmits the map information to the reception system 102. The transmission system 101 has a communication apparatus 110, a host computer 111, and a database 112.

The database 112 stores the map information to be distributed to a buyer. The database 112 is composed of a space database and a cache information database. The space database stores configuration data and attribute data as a table. The configuration data is data showing the configurations of an object (planimetric features such as roads, structures, and the like) constituting a map. The attribute data is data showing the attribute of the object (name and the like of planimetric features). The cache information database stores the drawn data of digital map information divided into a plurality of regions so that the drawn data can be updated in a unit of tile using each region, which is a unit of division, as the tile.

In contrast, the reception system 102 is installed on the buyer side of the map information, receives the map information data distributed from the transmission system 101, and updates the map information thereof. The reception system 102 has a communication apparatus 120, a host computer 121, and a database 122.

The database 122 is a database in which the map information held by the reception system 102 is stored. The database 122 is also composed of a space database and a cache information database likewise the database 112.

In the map information distribution system, the map information is distributed as described below.

First, it is assumed that the difference update information of the attribute data and the configuration data is sent from the server 105 of the destination and the information communication terminal 106 of the destination to the transmission system 101 through the network 104 after it is related to objects. The transmission system 101 updates the attribute data and the space data of the object, to which the space database in the database 112 corresponds, based on the received difference update information. The drawn data of the digital map is created based on the configuration data after it is updated.

Next, the transmission system 101 extracts the tile of the drawn data (hereinafter, referred to as "tile to be updated") which is changed by the difference update information. The transmission system 101 updates the drawn data of the tile to be updated of the cache information database in the database 112 based on the drawn data of the extracted tile to be updated.

The transmission system 101 periodically distributes the drawn data of the extracted tile to be updated and the attribute data of the changed object (hereinafter, referred to as "object to be updated") as differential data to the reception system 102 through the communication line 103.

When the differential data is distributed from the transmission system 101 to the reception system 102, the reception system 102 updates the drawn data of the tile to be updated of the cache information database in the database 122 based on the drawn data of the tile to be updated included in the differential data. Further, the reception system 102 updates the attribute data of the object to be updated of the space database in the database 122 based on the attribute data of the object to be updated included in the differential data.

Here, the update information of the map information, which is distributed from the vender to the buyer, is arranged as differential data. This is because since the ratio of the data amount of update information, which occupies the data amount the overall map information, is small, it is not effective to replace the overall map information each time map information is updated and a time and a cost necessary to distribution is wasted thereby. A method of creating the differential data is disclosed in, for example, Patent Document 2.

In the method of creating the differential data disclosed in Patent Document 2, first, a difference between a map before it is updated (hereinafter, referred to as "map before update") as a reference map and the latest map (hereinafter, referred to as "map after update") is determined on a transmit side (transmission system 101). With this operation, difference information composed of only the data of updated roads and landmarks is created.

FIGS. 11(a), 11(b), and 11(c) show examples of difference information. FIG. 11(b) is a map before update, and FIG. 11(c) is a map after update. The difference information shown in FIG. 11(a) is created by obtaining the difference between the two maps. A data transfer amount can be reduced by distributing the difference information, thereby an update process can be suppressed to a minimum necessary amount.

Further, in general, map information has a different format depending on a buyer. Accordingly, when the transmission system distributes updated map information, it must distribute the updated map information after the format thereof is converted into a format of each buyer. Further, it is also possible to apply a method disclosed in Patent Document 3 as a technology related to format conversion. In the method disclosed in Patent Document 3, when updated map information is distributed, a conversion program, which is different to each buyer, is distributed together with map information created by a common format. Then, the reception system converts the data of the common format into data of an original format.

Further, when a part of a map before update is updated, a matching process must be performed between an updated portion and a not-updated portion.

The "matching process" means a process for extracting the portion of map information (hereinafter, referred to as "related information"), which is other than an updated portion of the map information (hereinafter, referred to as "updated information") and conflicts with the updated portion of the map information and additionally updating the extracted portion of the map information so that the related information does not conflict with the updated information. A method of automatically performing the matching process is disclosed in Patent Document 2.

When, for example, the attribute of a link is changed, the update link may extend over a plurality of tiles. It is assumed, for example, that the update link extends over a tile A and a tile B. In this case, when only the link of the tile A is updated, the attribute of the link of the tile A is not matched with that of the link of the tile B. Accordingly, in the matching process, the link in the tile B that corresponds to the updated link in the tile A is also updated.

In the transmission system, when the map information is updated the distribution of the updated map information, the above matching process must be performed before updated map information is transmitted. An apparatus for automatically performing the matching process before transmission is disclosed in Patent Document 2.

Patent Document 1
Japanese Unexamined Patent Application Publication No. 2005-258340
Patent Document 2
Japanese Patent No. 3391171
Patent Document 3
Japanese Unexamined Patent Application Publication No. 11-258981

DISCLOSURE OF THE INVENTION

Problems to be Solved by the Invention

Incidentally, in the conventional map information distribution system as described above, when map information is distributed at the time a plurality of reception systems are connected to a transmission system and a vender of the map information provides map information to a plurality of buyers, a task for updating the map information is temporarily interrupted, all the data are displayed, matching process as the relation between data and the like is performed, and differential data is created, and thereafter the data must be distributed to each vender after the format of the data is converted to each vender. Therefore, since the task for updating the map information is not performed during the above period, the update of the map information to the latest map information is delayed on the vender side.

Further, in general, respective buyers do not need all the map information provided by the vender and need a different map information in many cases. For example, although a certain buyer may need the information of a one-way traffic as a road attribute, other buyer may not need the information of the one-way traffic. Further, although a certain buyer may need even the name of planimetric features as the attribute of the planimetric features in addition to the configuration of the planimetric features, other buyer may need only the configuration information of the planimetric features.

As described above, in general, the vender provides the respective buyers with an individually different type of map information depending on the contracts between the vender and the respective buyers. Accordingly, when the task for updating map information is entirely interrupted on the transmission system each time the map information is updated, update of the map information is delayed to all the buyers to distribute the map information that is needed only a part of the buyers. As a result, the freshness of data is equally deteriorated.

Further, when the type of the map information provided to the respective buyers is individually different, it is not necessary that the map data be entirely matched, and it is sufficient that the map data be matched within the range of the type of the map information provided to the respective buyers. However, in the conventional map information providing system, the format of data is converted to respective buyers and map information is provided after all the data is displayed and the relation between the data is matched. Thus, a problem arises in that it is difficult to provide map information to respective buyers promptly after the map information is updated.

Accordingly, an object of the present invention is to provide a map information provision technology which need not to interrupt a map information update task when the map information is distributed, can promptly provide the map information to respective buyers after it is updated, and can keep the map information to be provided very fresh.

Means for Solving the Problems

A map information management system of a first arrangement of the present invention, which is connected to a destination system located in a destination to which map information is provided through a communication line for managing, updating, and distributing the map data, is characterized by including a map to be updated database for storing map data to be updated used to update and maintain map information, an updated data database for storing updated data for updating the map information, map DB update means for updating, when updated data is input to update the map data of the map to be updated database, the map to be updated in the map to be updated database, updated data creation means for creating the differential data of the map data to be updated before and after it is updated by the updated data and storing the differential data to the updated data database as updated data, data distribution means for extracting, when it receives a request to distribute updated data from the destination system, the updated data stored in the updated data database in response to the distribution request and distributes it to the destination system.

According to the arrangement, the map data to be provided that is distributed to the destination system is separated from the map data to be updated to which a map data update task is performed, and when the map data to be updated is updated, a tag (updated data) of only the data to be updated is created and distributed. Accordingly, since it is not necessary to stop the distribution of the map information even while the map data to be updated is updated, a vender on the destination system side can obtain the latest map data at all times.

The map information management system according to a second arrangement of the present invention is characterized in the first arrangement in that the updated data creation means includes differential data creation means for creating the differential data between the map data to be updated before and after it is updated by the update data, and transaction data creation means for creating transaction data for stipulating a transaction for updating the map data to be updated before it is updated based on the differential data and storing the transaction data in the updated data database as updated data.

Since the updated data is arranged as the transaction data, the data amount of the updated data can be reduced, and thus a time necessary to data distribution can be reduced. Further, since the transaction data can be described by a program language such as JAVA (registered trademark) language and the like which does not depend on a platform and a data format, it can easily deal with a platform and a data format which are different in each destination system.

The map information management system according to a third arrangement of the present invention is characterized in the first or second arrangement by including a map to be provided database for storing map data to be provided that is distributed to the destination system, update execution means for reading the map to be provided stored in the map to be provided database and the updated data stored in the updated data database, changing the map data to be provided based on the updated data, and creating tentatively revised map data to be provided, data matching means for matching the data in the map data with the tentatively revised map data to be provided, creating revised map data to be provided, and storing it in the map data to be provided database, and map data to be provided revision means for updating the map data to be updated that is stored in the map to be updated database by the revised map data to be provided.

With this arrangement, when the map data to be provided is matched, the destination system can be provided with the map data at all times by remaining original map data to be provided and storing the map data to be provided, which is subjected to the matching process as newly revised map data to be provided.

Further, since the map data to be updated, the updated data, the map data to be provided are arranged independently from each other, respectively, a map data matching task can be performed independently of the map data to be updated using the updated data and the map data to be provided. That is, it is possible to continue update of the map data to be updated even while the map data matching task is performed. When the map data to be updated is replaced at the time the matching task is finished, it is not necessary to interrupt the map data update task. Since the update of the map data to be updated is not interrupted, it is possible to provide more fresh map information at all times.

Further, since the updated data and the map data to be provided are arranged independently from each other, respectively, when the map data to be provided is distributed to destination system once, it is sufficient for the destination system to be selectively distributed hereafter with updated data only when updated data that is used by the destination system is added to the updated data database. Therefore, since data is not uselessly distributed, the information process load on the map information management system can be reduced. Further, the task load on a worker who maintains the map data can be more reduced by providing the worker with only the data to be updated as the updated data than updating the map data in its entirety. As a result, since the map data is updated at a prompt cycle, it is possible to provide more fresh map data.

The map information management system according to a fourth arrangement of the present invention is characterized in any on of the first to third arrangements in that the data distribution means distributes the map to be provided data or the updated data to the destination system after it is encrypted.

According to the arrangement, the map information management system distributes all the map data to be provided or all the updated data to the destination system after they are uniformly encrypted without extracting the map information needed by each destination system. Then, the provided data can be decoded and extracted at the same time by the program provided by the vender side. With this operation, the information process load on the map information management system is reduced, and thus the map information can be distributed at a higher speed.

The map information management system according to a fifth arrangement of the present invention is characterized in any one of the first to fourth arrangements by including list creation means for creating a list of the updated data stored in the updated data database, and list distribution means for distributing the list of the updated data to the destination system in response to a request from the destination system, wherein when the data distribution means receives a request to distribute specific updated data in the list of the updated data from the destination system, it extracts the updated data stored in the updated data database in response to the distribution request and distributes it to the destination system.

With this arrangement, the destination system can select only necessary updated data and request to distribute it after it checks the list of the updated data. Accordingly, since it is not necessary to uselessly distribute the map information, the information process load on the map information management system is reduced, and the map information can be distributed at a higher speed.

The present invention according to a program is characterized in that the program is executed by being read by a computer to cause the computer to function as the map information management system.

A map information distribution system of the first arrangement of the present invention, which updates, manages, and distributes map information, is connected to a destination system as a destination to which the map information is provided through a network is characterized by including a map to be updated database for storing map data to be updated used to update and maintain map information, an updated data database for storing updated data for updating the map information, a map to be provided database for storing a map data to be provided that is distributed to the destination system, map database DB update means for updating, when updated data is input to update the map data of the map to be updated database, the map to be updated in the map to be updated database, updated data creation means for creating the differential data of the map data to be updated before and after it is updated by the updated data and storing the differential data to the updated data database as updated data, data distribution means for extracting, when it receives a request to distribute updated data from the destination system, the updated data stored in the updated data database in response to the distribution request and distributes it to the destination system, update execution means for reading the map to be provided stored in the map to be provided database and the updated data stored in the updated data database, changing the map data to be provided based on the updated data, and creating tentatively revised map data to be provided, data matching means for matching the tentatively revised map data to be provided so that the extracted updated data does not conflict with the map data to be provided, creating revised map data to be provided, and storing it in the map to be provided database, and map data to be updated revision means for revising the map data to be updated stored in the map to be updated database by the revised map data to be provided, wherein the destination system includes a destination map database for storing destination map data used in the destination system, distribution request means for transmitting a request to distribute updated data to the map information management system, format conversion means for converting, when it receives the updated data from the map information management system, object data created based on the updated data into a format used in the destination system; and map update means for updating the destination map data of the map to be provided database based on the object data the format of which is converted by the format conversion means.

The map information distribution system according to a second arrangement of the present invention is characterized in the first arrangement in that the destination system includes data extraction means for extracting, when it receives the updated data from the map information management system, the necessary updated data that is needed by the destination system from the data, and map update means for updating the destination map data of the destination map database based on the necessary updated data extracted by the data extraction means, wherein the format conversion means converts the object data created based on the necessary updated data extracted by the data extraction means into a format used in the destination system.

The map information distribution system according to the third arrangement of the present invention is characterized in the first or second arrangements in that the updated data creation means of the map information management system includes differential data creation means for creating the differential data between the map data to be updated before and after it is updated by the update data, and transaction data creation means for creating transaction data for stipulating a transaction for updating the map data based on the differential data and storing the transaction data in the updated data database as updated data, wherein the data update means of the destination system comprises transaction process means for performing the transaction process which is stipulated by the transaction data that is the necessary updated data extracted by the data extraction means referring to the destination map data of the destination map data base and creating object data for updating the destination map data.

The map information distribution system according to the fourth arrangement of the present invention characterized in any one of the first to third arrangements in that the data distribution means of the map information management system distributes the updated data to the destination system by encrypting it, and when the data extraction means of the destination system receives the encrypted updated data from the map information management system, it decodes the data as well as extracts the necessary updated data needed by the destination system.

The map information distribution system according to the fifth arrangement of the present invention is characterized in any one of the first to fourth arrangements in that the map information management system includes list creation means for creating a list of the updated data stored in the updated data database, and list distribution means for distributing the list of the updated data to the destination system in response to a request to distribute the list from the destination system, wherein when the data distribution means receives a request to distribute specific updated data in the list of the updated data from the destination system, it extracts the updated data stored in the updated data database in response to the distribution request and distributes it to the destination system, and the destination system includes list distribution request means for transmitting a request to distribute the list to the map information management system, and list presentation means for displaying the list on a display device when it receives the list of the updated data from the map information management system and prompting a user to select updated data in the list, wherein when the user selects the specific updated data in the list, the distribution request means transmits a request to distribute the specific updated data to the map information management system.

A destination system according to the first arrangement of the present invention connected to a map information management system for updating, managing, and distributing map data through a network is characterized by including a destination map database for storing destination map data used in the destination system, distribution request means for transmitting a request to distribute updated data for updating the destination map data to the map information management system, format conversion means for converting, when it receives the updated data from the map information management system, object data created based on the updated data into a format used in the destination system, and map update means for updating the destination map data of the destination map database based on the object data the format of which is converted by the format conversion means.

The destination system according to the second arrangement of the present invention is characterized in the first arrangement by including data extraction means for extracting, when it receives the updated data from the map information management system, the necessary updated data that is needed by the destination system the data, and map update means for updating the destination map data of the destination map database based on the necessary updated data extracted by the data extraction means, wherein the format conversion means converts the object data created based on the necessary updated data extracted by the data extraction means into a format used in the destination system.

Advantages of the Invention

As described above, according to the present invention, since the map data to be provided, the updated data, and the map data to be provided are arranged independent from each other, respectively, when the map information is distributed, it is not necessary to stop a map information update task so that the map information can be promptly provided to each buyer after it is updated. Further, since the map information update task is not interrupt, it is possible for the map information to be provided to keep excellent freshness at all times.

Figure 1:
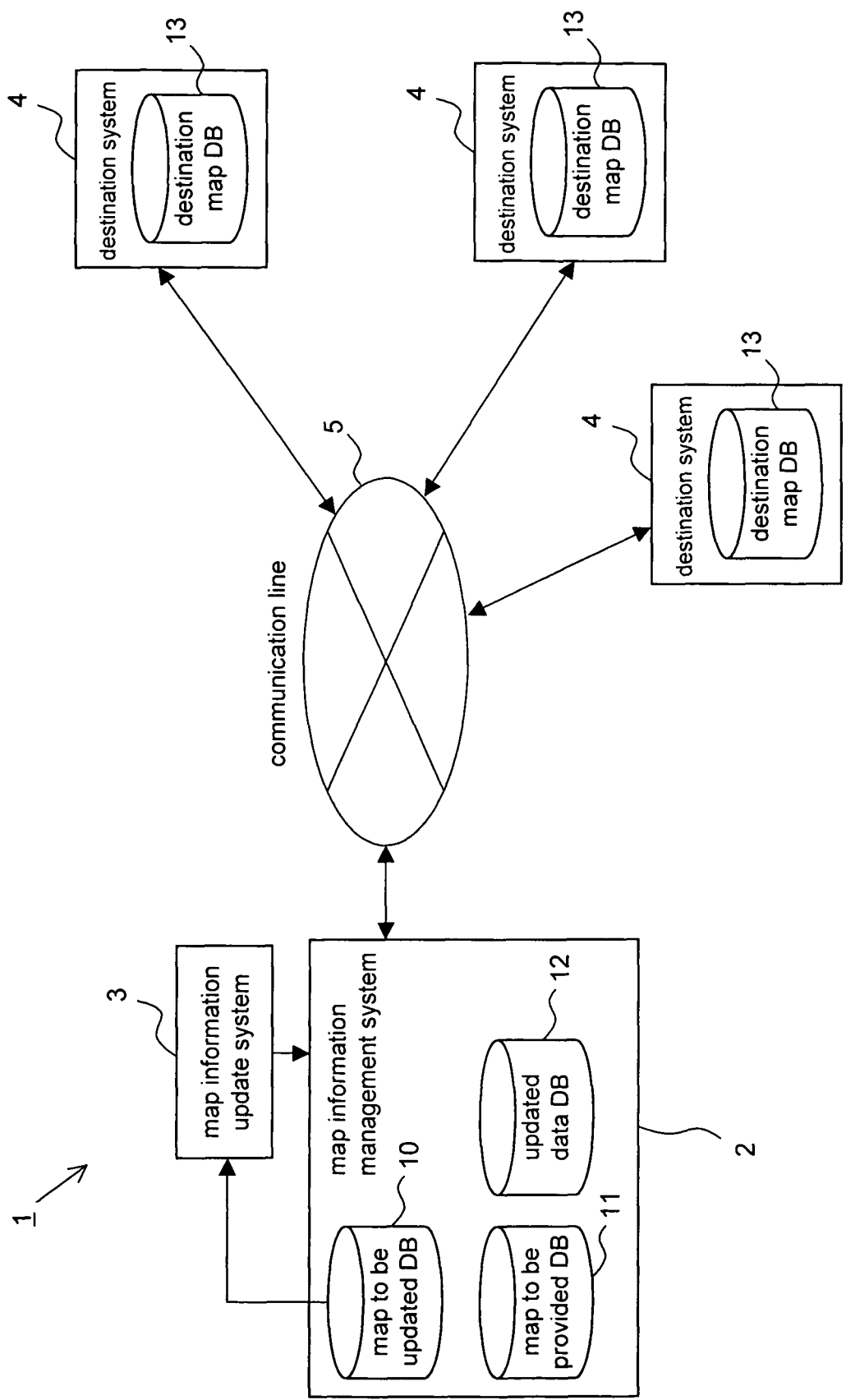
FIG. 1 is a view showing an overall arrangement of a map information distribution system 1 according to an embodiment 1 of the present invention.

REFERENCE NUMERALS 1 map information distribution system
2 map information management system
3 map information update system
4 destination system
5 communication line
10 map to be updated database
11 map data to be provide base
12 updated data database
13 destination map data base
14 distribution history database
20 map DB update means
21 updated data creation means
22 data distribution means
23 list creation means
24 list distribution means
25 map data revision means
30 differential data creation means
31 transaction data creation means
32 map data distribution means
33 updated data extraction means
34 updated data distribution means
35 update execution means
36 data matching means
37 map to be updated data revision means
40 input device
41 display device
42 list distribution request means
43 list presentation means
44 distribution request means
45 data extraction means
46 data update means
50 transaction process means
51 format conversion means
52 map update means

BEST MODE FOR CARRYING OUT THE INVENTION

A best mode for carrying out the invention will be explained below referring to the drawings.

[Embodiment 1]

FIG. 1 is a view showing an overall arrangement of a map information distribution system 1 according to an embodiment 1 of the present invention. The map information distribution system is composed of a map information management system 2, a map information update system 3, and a plurality of destination systems 4. The respective destination systems 4 are connected to the map information management system 2 through a communication line 5 such as a phone line, the Internet, and the like. The map information management system 2 is connected to the map information update system 3 through a network such as LAN, WAN, and the like. The map information management system 2 and the map information update system 3 are installed on a vender side that provides map information. The respective destination systems 4 are installed on a buyer side that receives the map information.

The map information management system 2 is a system that updates, manages, and distributes the map information. The map information management system 2 is composed of a computer and an external storage device as hardware.

Further, the map information management system 2 has a map to be updated database 10 (hereinafter, referred to as "map to be updated DB 10"), a map to be provided database 11 (hereinafter, referred to as "map to be provided DB 11"), and an updated data database 12 (hereinafter, referred to as "updated data DB 12") disposed therein. The map to be updated DB 10 is a database in which the map data to be updated used to update and to maintain the map information is stored. The map to be provided DB 11 is a database in which a map data to be provided that is distributed to the destination system 4 is stored. The updated data DB 12 is a database in which updated data that updates the map data to be provided is stored.

The map information update system 3 is a system that performs a correction task for correcting and updating the map information managed by the map information management system 2. The map information update system 3 is composed of a computer and an external storage device as hardware and has software such as CAD and the like installed thereon.

The destination system 4 is a system that creates and manages map data necessary to respective buyers based on the data provided from the map information management system 2. The destination system 4 has a destination map database 13 (hereinafter, referred to as "destination map DB 13") in which the destination map data managed by the respective buyers are stored.

Figure 2:
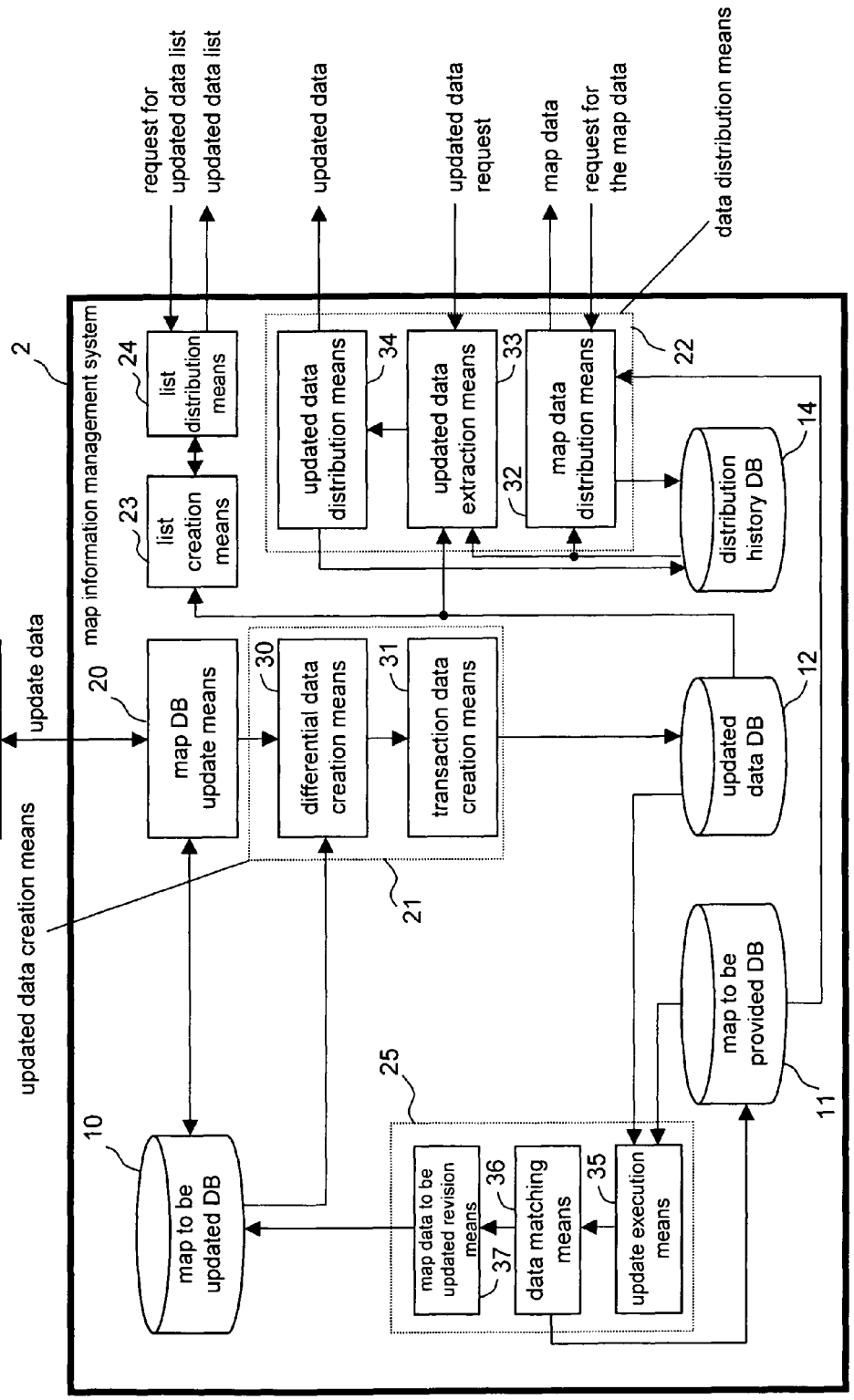
FIG. 2 is a view showing an arrangement of a map information management system 2 of FIG. 1.

FIG. 2 is a view showing an arrangement of the map information management system 2 of FIG. 1. The map information management system 2 has the map to be updated DB 10, the map to be provided DB 11, the updated data DB 12, a distribution history database 14 (hereinafter, referred to as "distribution history DB 14"), a map DB update means 20, an updated data creation means 21, a data distribution means 22, a list creation means 23, a list distribution means 24, and a map data revision means 25.

The map to be updated DB 10, the map to be provided DB 11, and the updated data DB 12 are as explained in FIG. 1. Further, the distribution history DB 14 is a database for storing which data was distributed to the respective buyers by a vender.

When updated data, which updates the map data of the map to be updated DB 10, is input from the map information update system 3 to the map DB update means 20, it updates the map data to be updated in the map to be updated DB 10.

The updated data creation means 21 creates data for updating the map to be provided data and stores it to the updated data DB 12 as updated data. The updated data creation means 21 is composed of a differential data creation means 30 and a transaction data creation means 31. The differential data creation means 30 creates the differential data of the map to be updated data before and after it is updated by update data. The transaction data creation means 31 creates transaction data which defines a transaction for updating the map to be provided data based on the differential data and stores it to the updated data DB 12 as updated data. The transaction data will be explained later in detail.

When the data distribution means 22 receives a request for distributing of the map data or the updated data from the destination system 4, it extracts the map data to be provided or the updated data from the respective databases in response to the distribution request and distributes it to the destination system 4. The data distribution means 22 is composed of a map data distribution means 32, an updated data extraction means 33, and an updated data distribution means 34.

When the map data distribution means 32 receives the request for the map data from the destination system 4, it reads out the map to be provided data of the latest edition from the map to be provided DB 11 and distributes it to the destination system 4. At the time, a distribution history is recorded to the distribution history DB 14.

Here, the "request for the map data" is a request signal transmitted from the destination system 4 to the map information management system 2 to request to distribute the map data to be provided.

When the updated data extraction means 33 receives the updated data request from the destination system 4, it extracts the updated data specified by the distribution request from the updated data DB 12. The updated data distribution means 34 distributes the extracted updated data to the destination system 4. Here, the "updated data request" is a request signal transmitted from the destination system 4 to the map information management system 2 and means a request to distribute the updated data.

When the list creation means 23 receives a request for an updated data list from the destination system 4, it creates a list of the updated data stored in the updated data DB 12 (hereinafter, referred to as "updated data list"). Further, the list distribution means 24 distributes the updated data created by the list creation means 23 to the destination system 4. Here, the "request for updated data list" is a request signal transmitted from the destination system 4 to the map information management system 2 to request to transmit the list of updated data stored in the updated data DB 12.

The map data revision means 25 revises the map data to be provided in the map to be provided DB 11 and the map data to be updated in the map data to be updated DB 10. The map data revision means 25 is composed of a computer which is independent from the other components in the map information management system 2. The map data revision means 25 is composed of an update execution means 35, a data matching means 36, and a map data to be updated revision means 37.

When a manager of the vender inputs an instruction for executing a revision process, the update execution means 35 reads out the map data to be provided from the map to be provided DB 11 as well as reads out the updated data from the updated map DB 12, executes a transaction process, and creates tentatively revised map data to be provided. The data matching means 36 performs a matching process of an object related to the object changed by the updated data as to the revised map data to be provided, and creates a finally revised map data to be provided. The thus created revised map data to be provided is stored in the map to be provided DB 11 as map data to be provided having a new revision number (Revision). Further, the map data to be updated revision means 37 updates the map data to be updated of the map to be updated DB 10 to the revised map data to be provided.

Note that the map DB update means 20, the updated data creation means 21, the data distribution means 22, the list creation means 23, the list distribution means 24, and the map data revision means 25 described above are realized as program modules, and the functions of these means can be realized by causing the respective computers in the map information management system 2 to execute these program modules.

Figure 3:
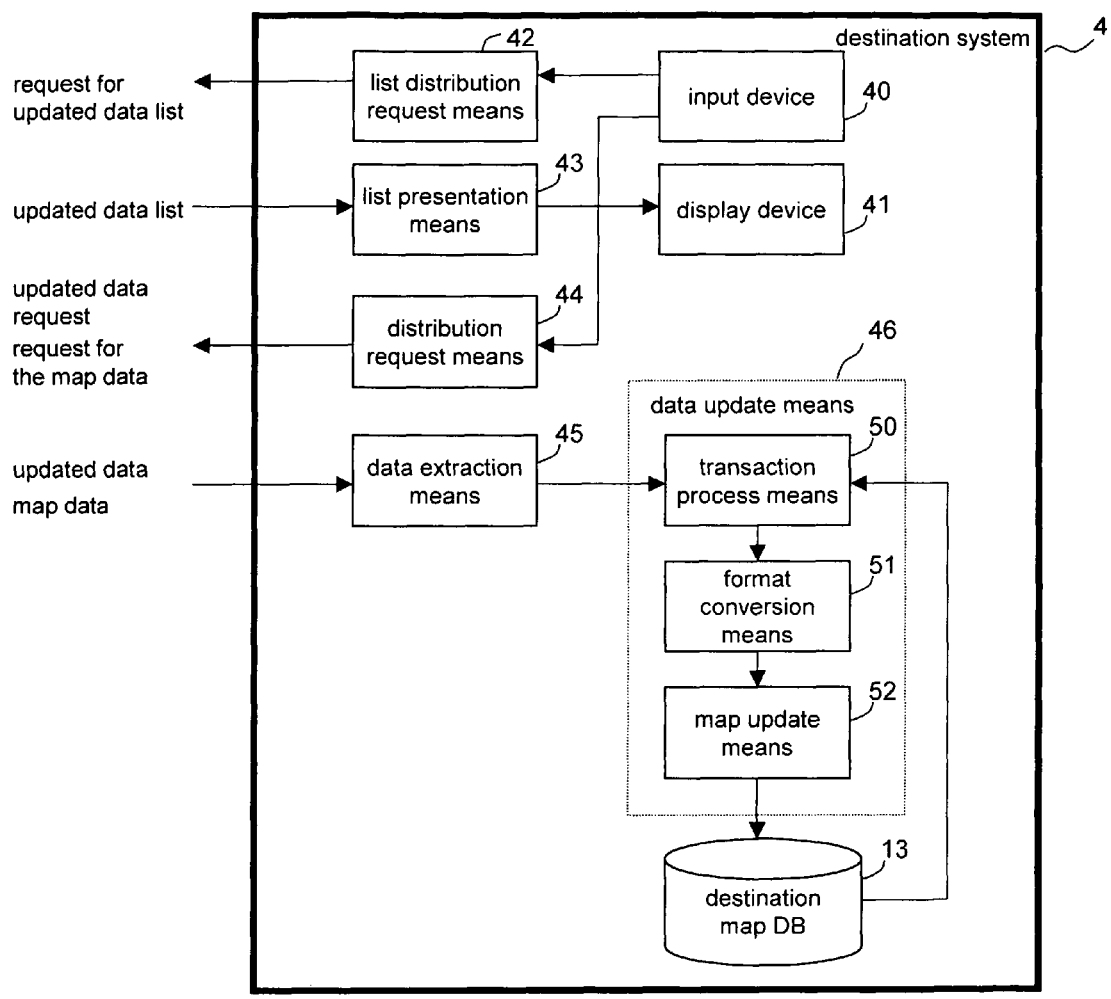
FIG. 3 is a view showing an arrangement of a destination system 4 of FIG. 1.

FIG. 3 is a view showing an arrangement of the destination system 4 of FIG. 1. The destination system 4 has the destination map DB 13, an input device 40, a display device 41, a list distribution request means 42, a list presentation means 43, a distribution request means 44, a data extraction means 45, and a data update means 46.

The destination map DB 13 stores the destination map data managed by the buyer having the destination system 4. The input device 40 is a device for inputting an instruction to a computer such as a keyboard, a mouse, and the like. The display device 41 is a device such as a display unit and the like for displaying data such as an image and a character.

The list distribution request means 42 transmits a request for the updated list to the map information management system 2 based on an instruction input by a user of the buyer through the input device 40. When a list of the updated data is transmitted from the map information management system 2 to the list presentation means 43 in response to a request for the list of updated data, it creates the list of the updated data based on the data of the updated list and displays it on the display device 41.

When the user of the buyer inputs an instruction for requesting to distribute the map data or an instruction for requesting to distribute specific updated data to the distribution request means 44 through the input device 40, it transmits a request for the map data or a request for the updated data to the map information management system 2.

The map data to be provided or the specific updated data is transmitted from the map information management system 2 to the data extraction means 45 in response to the request for the map data or the request for the updated data, it extracts only the data, which is needed by the destination system 4, from the data. The extracted data is referred to as "necessary map data" or "necessary updated data".

The data update means 46 updates the destination map data stored in the destination map DB 13 based on the necessary map data or the necessary updated data extracted by the data extraction means 45. The data update means 46 has a transaction process means 50, a format conversion means 51, and a map update means 52.

When the data extracted by the data extraction means 45 is the necessary updated data, the transaction process means 50 extracts a partial data, which is updated by the necessary updated data, from the destination map data stored in the destination map DB 13 as necessary, performs a transaction process based on the necessary updated data, and creates data to be updated. The format conversion means 51 converts the format of the data to be updated into the format used by the buyer of the destination system 4. The map update means 52 updates the destination map data in the destination map DB 13 based on the data to be updated having the converted format.

Note that the list distribution request means 42, the list presentation means 43, the distribution request means 44, and the data extraction means 45 can be realized by causing the program modules provided by the vender to be read and executed by the computer of the destination system 4. Further, the transaction process means 50, the format conversion means 51, and the map update means 52 can be realized by causing the program modules provided and customized by the buyer to be read and executed by the computer of the destination system 4.

An operation of the map information distribution system 1 of the embodiment 1 arranged as described above will be explained below.

Figure 4:
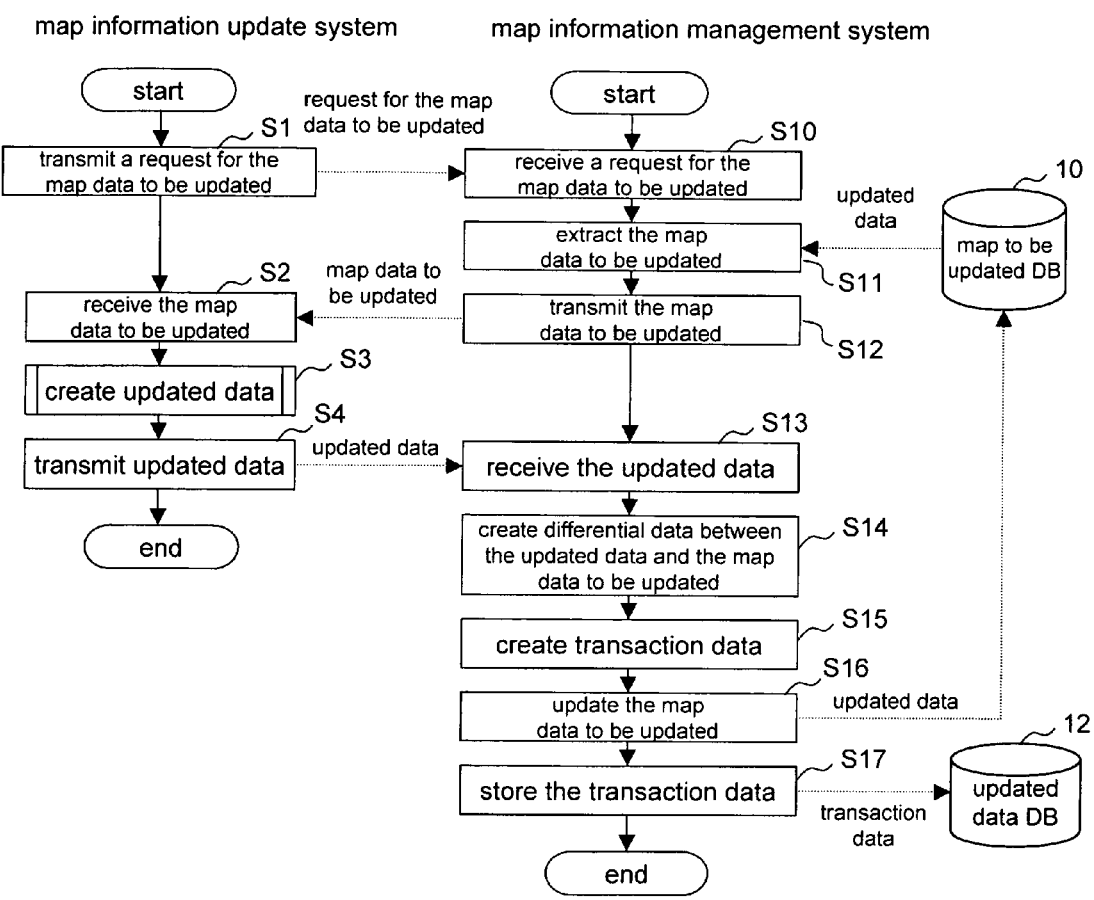
FIG. 4 is a flowchart showing a map information update process in the map information management system 2 according to the embodiment 1 of the present invention.

FIG. 4 is a flowchart showing an update process of the map information in the map information management system 2 according to the embodiment 1 of the present invention.

First, when a task for updating the map information is performed by the vender, a worker inputs an instruction for requesting the map data to be updated by the computer of the map information update system 3 at step S1. The map information update system 3 transmits a request for the map data to be updated to the map information management system 2. It is assumed here that the map data to be updated is specified in a unit of tile. That is, the worker requests the map data to be updated, to which he or she intends to perform the update task, by specifying a tile thereof.

At step S10, the map information management system 2 receives a request for the map data to be updated.

At step S11, the map DB update means 20 of the map information management system 2 extracts the map data to be updated of the tile specified by the request for the map data to be updated from the map data to be updated DB 10.

At step S12, the map DB update means 20 transmits the extracted tile of the map data to be updated to the map information update system 3.

Next, at step S2, the map information update system 3 receives the tile of the map data to be updated transmitted from the map information management system 2.

At step S4, the worker corrects, adds or deletes an object included in the tile. Here, the object is a unit that constitutes the map data. Ordinarily, the map data of an electronic map is composed of links and nodes showing roads and rail roads and polygons and images showing planimetric features, rivers, contours, and the like, and each of these links, nodes, polygons, images and the like is managed as one object. When the map information is updated, these objects are added or deleted, or the coordinates and the attribute information of the objects are changed.

When the task for correcting, adding or deleting the objects contained in the tile is completed, the worker inputs an instruction to the computer of the map information update system 3 to transmit updated data.

When the instruction to transmit the updated data is input, the map information update system 3 transmits the data of the tile that is corrected, added or deleted (hereinafter, referred to as "updated data") to the map information management system 2.

At step S13, the map information management system 2 receives the updated data from the map information update system 3.

At step S14, the differential data creation means 30 compares the updated data with the tile of the map data to be updated before update corresponding to the updated data and creates differential data showing the difference therebetween. Here, the differential data is obtained by extracting the objects which are changed, added, and deleted using one object as a minimum unit.

Figure 5:
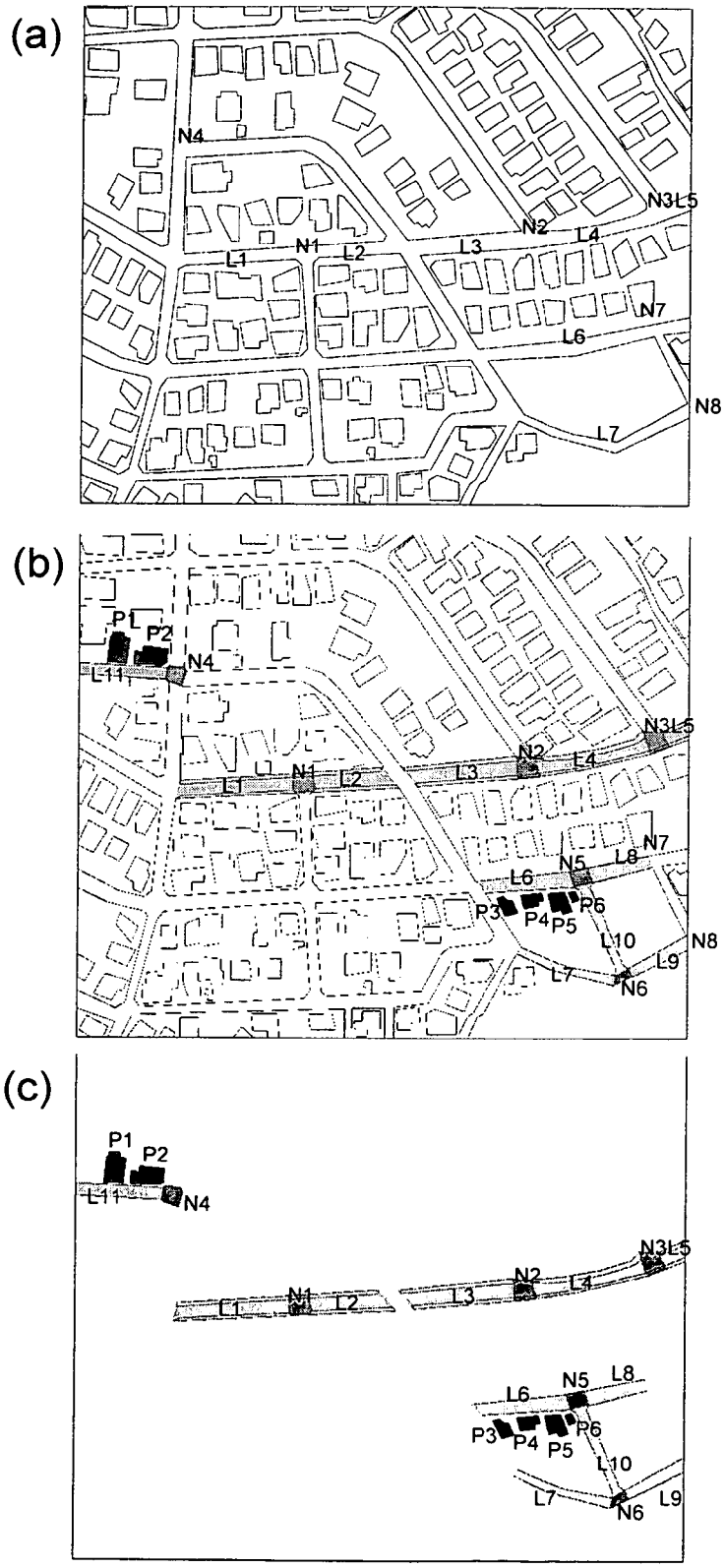
FIG. 5(a) is a view showing an example of map data to be updated before update.
FIG. 5(b) is a view showing an example of map data to be updated after update.
FIG. 5(c) is a view showing an example of differential data.

For example, it is assumed that the tile of the map data to be updated before update is as shown in FIG. 5(a). It is assumed that the tile is corrected by the worker in the map information update system 3 as shown in FIG. 5(b). A "footpath" is added to the attributes of the objects corresponding to links L1, L2, L3, L4, L5 and nodes N1, N2, N3 in FIG. 5(b). Further, links L10, L11 and nodes N5, N6 are added. The configuration of the node N4 is changed because the link L11 is added. Further, the links L6, L7 are divided into the links L6, L8, and the links L7, L9 because the link L11 and the nodes N5, N6 added. Further, polygons P1, P2, P4, P5, P6 showing the planimetric features are added. In this case, the differential data is as shown in FIG. 5(c).

At step S15, the transaction data creation means 31 creates transaction data based on the differential data.

Here, the "transaction" means one unit of process in which a plurality of processes, which are related to a series of processes of change for changing, adding, or deleting an object are collected. In, for example, an example of FIG. 5, when the link L10 is added, the transaction is changed as described below.

(1) The configuration of the link L6 is changed from a configuration of FIG. 5(a) to a configuration of FIG. 5(b).

(2) The node N5 of the configuration of FIG. 5(b) is added to the right end point of the link L6.

(3) The configuration of the link L7 is changed from the configuration of FIG. 5(a) to the configuration of FIG. 5(b).

(4) The node N6 of the configuration of FIG. 5(b) is added to the right end point of the link L7.

(5) The link L8 of the configuration of FIG. 5(b) is added to connect the node N5 to the node N7.

(6) The link L9 of the configuration of FIG. 5(b) is added to connect the node N6 to the node N8.

(7) The link L10 of the configuration of FIG. 5(b) is added to connect the node N5 to the node N6.

The transaction data is data which expresses a transaction composed of a series of the processes by a programming language that does not depend on a platform such as JAVA (registered trademark) language and the like.

At step 16, the map DB update means 20 updates the map data to be updated in the map to be updated DB 10 to new map data to be updated subjected to the above correction.

Finally, at step S17, the transaction data creation means 31 stores the transaction data created as described above in the updated data DB 12 as updated data and finishes the process.

The map information update system 3 sequentially updates the map data to be updated in the map to be updated DB 10 by the above process. Further, each time the map data to be updated is updated, the map data, which is changed by update is stored in the updated data DB 12 as updated data.

Next, a revision process of the map data to be provided in the map to be provided DB 11 and the map data to be updated in the map to be updated DB 10 will be explained. Although the map data to be updated is sequentially updated and updated data is accumulated in the updated data DB 12 by the update process of the map information described above, it is necessary to revise the map data to be provided and the map data to be updated at a predetermined timing after the map data is matched in its entirety. The matching process and the revision process are performed in the revision process of the map data.

Figure 6:
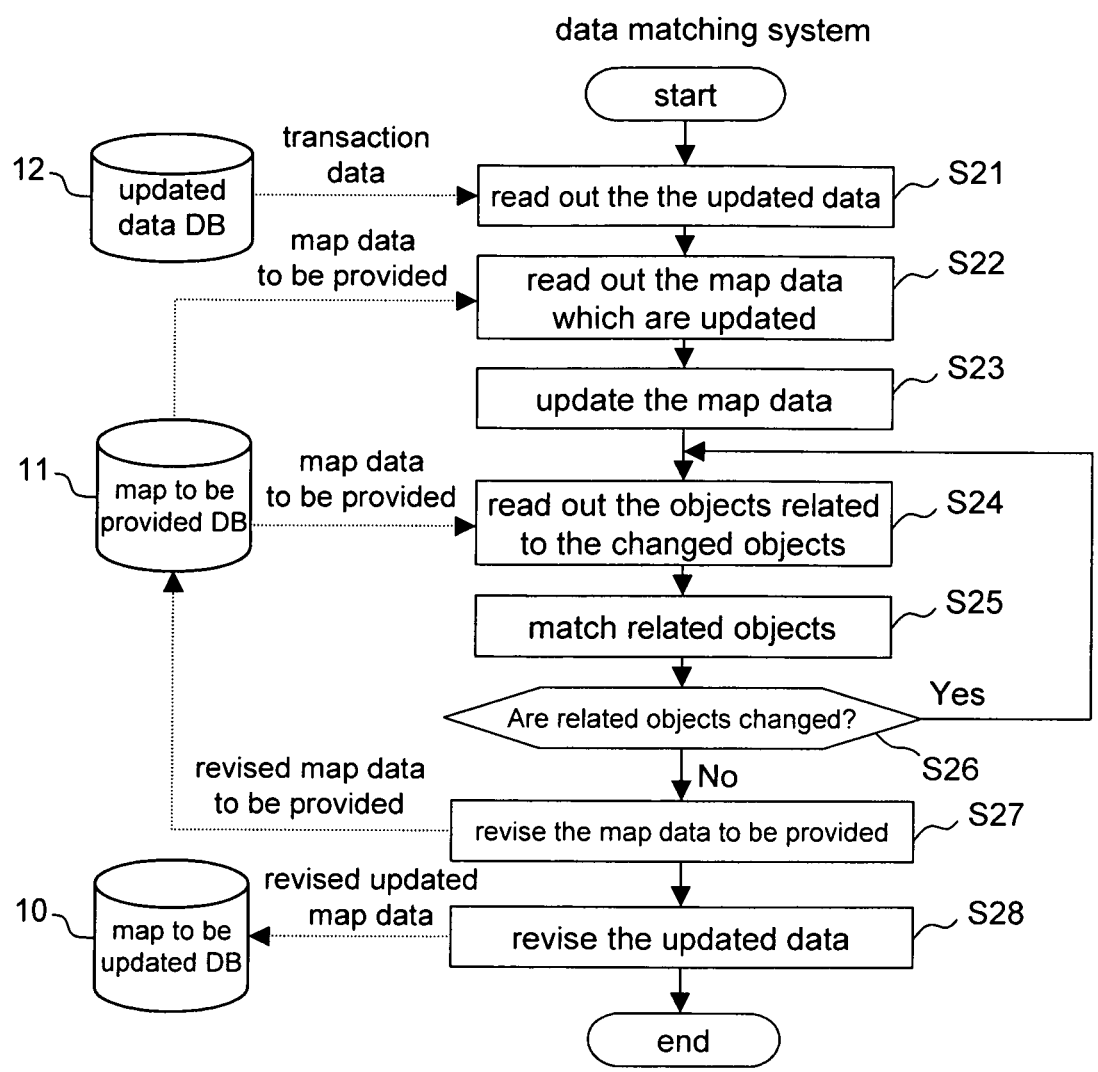
FIG. 6 is a flowchart showing a map data revision process in the map information management system 2 according to the embodiment 1 of the present invention.

FIG. 6 is a flowchart showing the revision process of the map data in the map information management system 2 according to the embodiment 1 of the present invention. The revision process of the map data is performed by the map data revision means 25 in the map information management system 2.

First, at step S21, the update execution means 35 reads out the respective pieces of the updated data accumulated in the updated data DB 12.

Next, the update execution means 35 reads out the data of the objects, which are updated by the respective pieces of the updated data, from the map to be provided DB 11 at step S22 and subjects the objects to a transaction process based on the updated data at step S23 to thereby update the map data. The map data to be provided in which the objects, which are changed, added, or deleted (hereinafter, referred to as "changed objects") are updated, is called tentatively revised map data to be provided and temporarily stored in the map to be provided DB 11.

Next, at step S24, the data matching means 36 reads out the objects related to the respective changed objects from the tentatively revised map data to be provided. Here, the "objects related to the changed objects" mean the objects which must be updated because the changed objects are updated.

Figure 7:
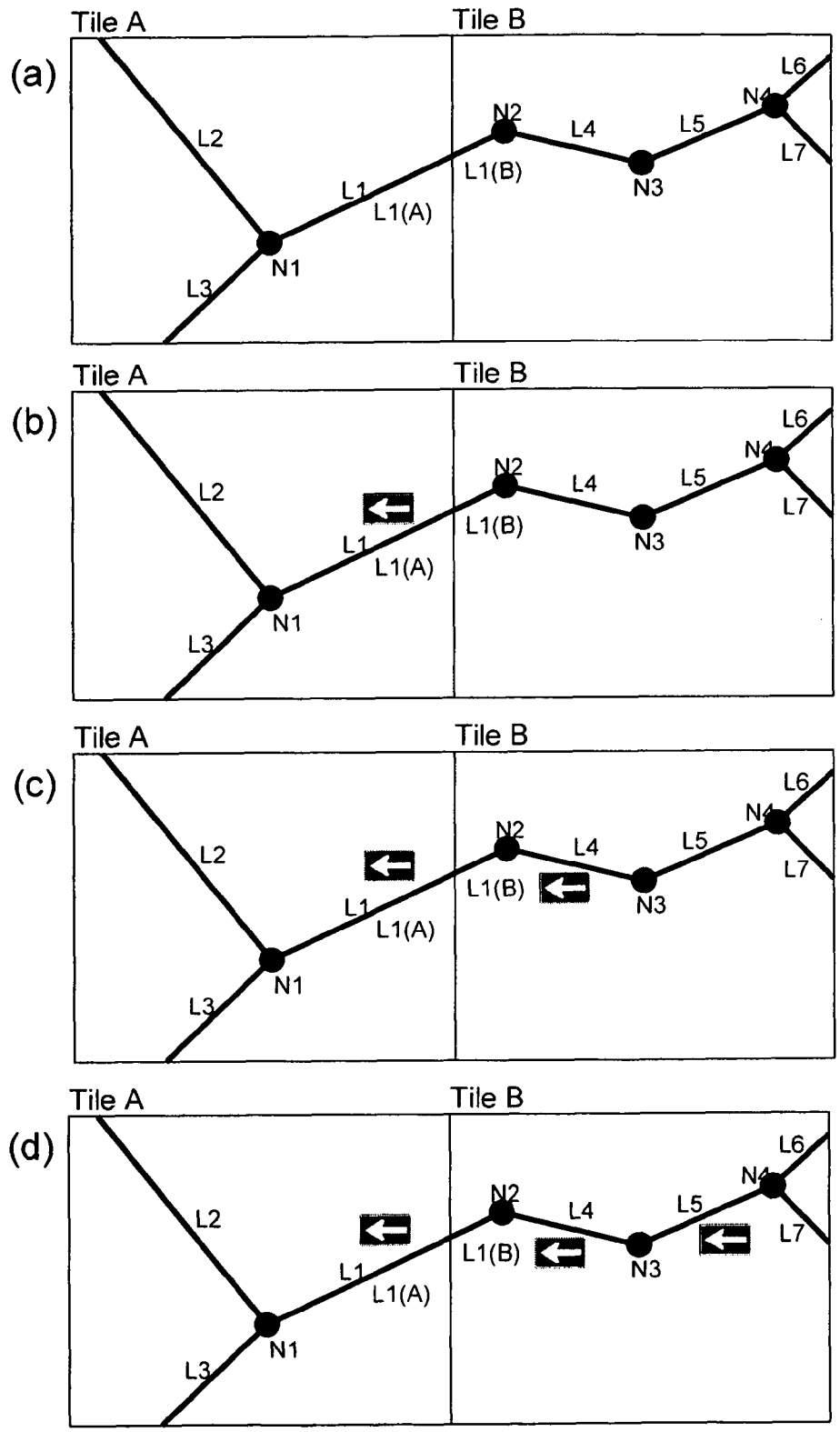
FIGS. 7(a), 7(b), 7(c), and 7(d) are views explaining a matching process of related objects.

It is assumed, for example, that the road attribute of a road link L1(A) in a tile A of FIG. 7(*a*) is changed from a two-way traffic to a one-way traffic and that the road link L1(A) extends over two tiles A, B (refer to FIG. 7(*b*)). In this case, although the road link L1(A) in the tile A is a changed object, since the road attribute of a road link L1(B), which shows the same road in the tile B must be also changed from the two-way traffic to the one-way traffic because the above object is changed, the road link L1(B) is an object related to the changed object.

Next, at step S25, the data matching means 36 matches related objects with each other that are extracted.

If the related objects are changed, the data matching means 36 returns to step S24 again and repeats steps S24 to S25. With this operation, all the objects in the tentatively revised map data to be provided are matched.

When, for example, the road attribute of the road link L1(A) in the tile A of FIG. 7(*a*) is changed from the two-way traffic to the one-way traffic, first, the road link L1(B), which shows the same road in the tile B, is extracted as the related object, and the road attribute of the road link L1(B) is changed from the two-way traffic to the one-way traffic (refer to FIG. 7(*b*)). Next, since the road attribute of the road link L1(B) is changed, a road link L4 in the tile B is extracted as a related object, and the road attribute of the road link L4 is changed from the two-way traffic to the one-way traffic (refer to (FIG. 7(*c*)). Further, since the road attribute of the road link L4 is changed, a road link L5 in the tile B is extracted as a related object, and the road attribute of the road link L5 is changed from the two-way traffic to the one-way traffic (refer to FIG. 7(*d*)). Since no related object exist due to the change of the road attribute of the road link L5, the process at steps S24 to S25 is finished. With this operation, the objects in the tentatively revised map data to be provided are matched.

Next, at step S27, the data matching means 36 stores the tentatively revised map data to be provided, in which the matching is performed between the objects, in the map to be provided DB 11 as revised map data to be provided. Since the map data to be provided is sequentially revised, it is managed in the map to be provided DB 11 by a revision number (Revision Number) added thereto.

Finally, the map data to be updated revision means 37 updates the map data to be updated in the map to be updated DB 10 to the revised map data to be provided. In this case, after the revised map data to be provided is stored once in the map to be updated DB 10 independently of the map data to be updated, the map data to be updated is replaced with the revised map data to be provided all together at a certain timing. With this operation, only the map data having been subjected to the matching process exist in the map to be updated DB 10.

Since the matching process is performed as described above, the map data to be provided before revision in the providing map DB 11 can be placed in the state that it can be downloaded at all times even during a period in which the matching process is performed. Further, since the map data revision means 25 is composed of the computer, which is independent of the other components in the map information management system 2, the map data to be provided in the map to be updated DB 10 is placed in a suitable state at all times even during the period in which the revision processing of the map data is performed. Accordingly, the state, in which a task for updating the map information can be performed on the vender side, can be kept at all times.

Next, a process for distributing the map data to be provided to the destination system 4 of the buyer (map information distribution process) and a process for distributing the updated data to the destination system 4 of the buyer (updated information distribution process) will be explained.

Figure 8:
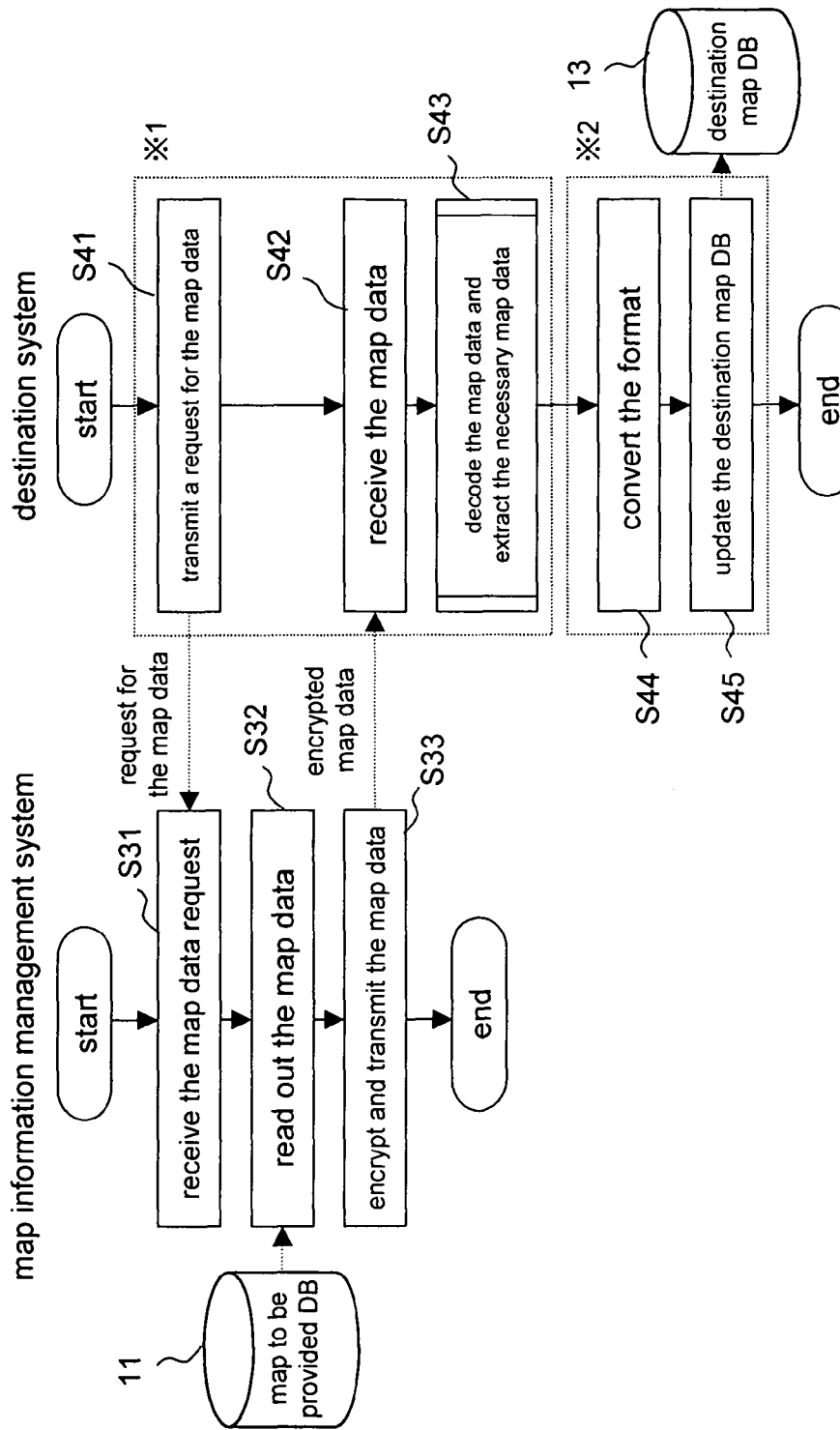
FIG. 8 is a flowchart showing a map information distribution process of the map information distribution system 1 according to the embodiment 1 of the present invention.

FIG. 8 is a flowchart showing the map information distribution process of the map information distribution system 1 according to the embodiment 1 of the present invention.

First, at step S41, when a user of the buyer side inputs an instruction for requesting to distribute the map data from the input device 40 of the destination system 4, the distribution request means 44 transmits a request for the map data to the map information management system 2.

At step S31, the map data distribution means 22 in the map information management system 2 receives the map data request.

At step S32, the map data distribution means 22 reads out the map data to be provided that is stored in the map to be provided DB 11. Then, the read-out map data is encrypted. At the time, although each vender needs a different type of map information, necessary map information is not extracted here. With this operation, a process load on the computer (server) in the map information management system 2 can be reduced and a process time can be shortened.

At step S33, the map data distribution means 32 transmits the encrypted map data to the destination system 4 which requests to distribute it. Further, the map data distribution means 32 records the ID of the destination system 4 to which the map data was distributed, a distribution date, the revision number of the distributed map data, and the like to the distribution history DB14.

At step S42, the destination system 4 receives the encrypted map data.

At step S43, the data extraction means 45 of the destination system 4 decodes the encrypted map data. Then, the data extraction means 45 extracts the data, which is needed by the buyer who manages the destination system 4 (necessary map data) from the map data.

The necessary map data is stipulated by a license bought by the buyer. That is, the map data includes attribute information such as a one-way traffic, the cost information of a road, and the like, land mark information displayed on a map, and additional information such as a type of planimetric features and image information in addition to the basic map information such as the position information of a road, a configuration of the road, the position information of an intersection, and the like. Since additional information needed by each buyer is different, and what type of additional information is bought by a buyer is stipulated by the license that is bought by the buyer from the vender. Accordingly, the data extraction means 45 extracts necessary map data according to a license being set.

Next, the format conversion means 51 converts the format of the necessary map data into the original format used by the buyer.

Finally, at step S45, the map update means 52 stores the necessary map data the format of which is converted in the destination map DB 13 and updates the destination map data to thereby finish the map information distribution process.

Figure 9:
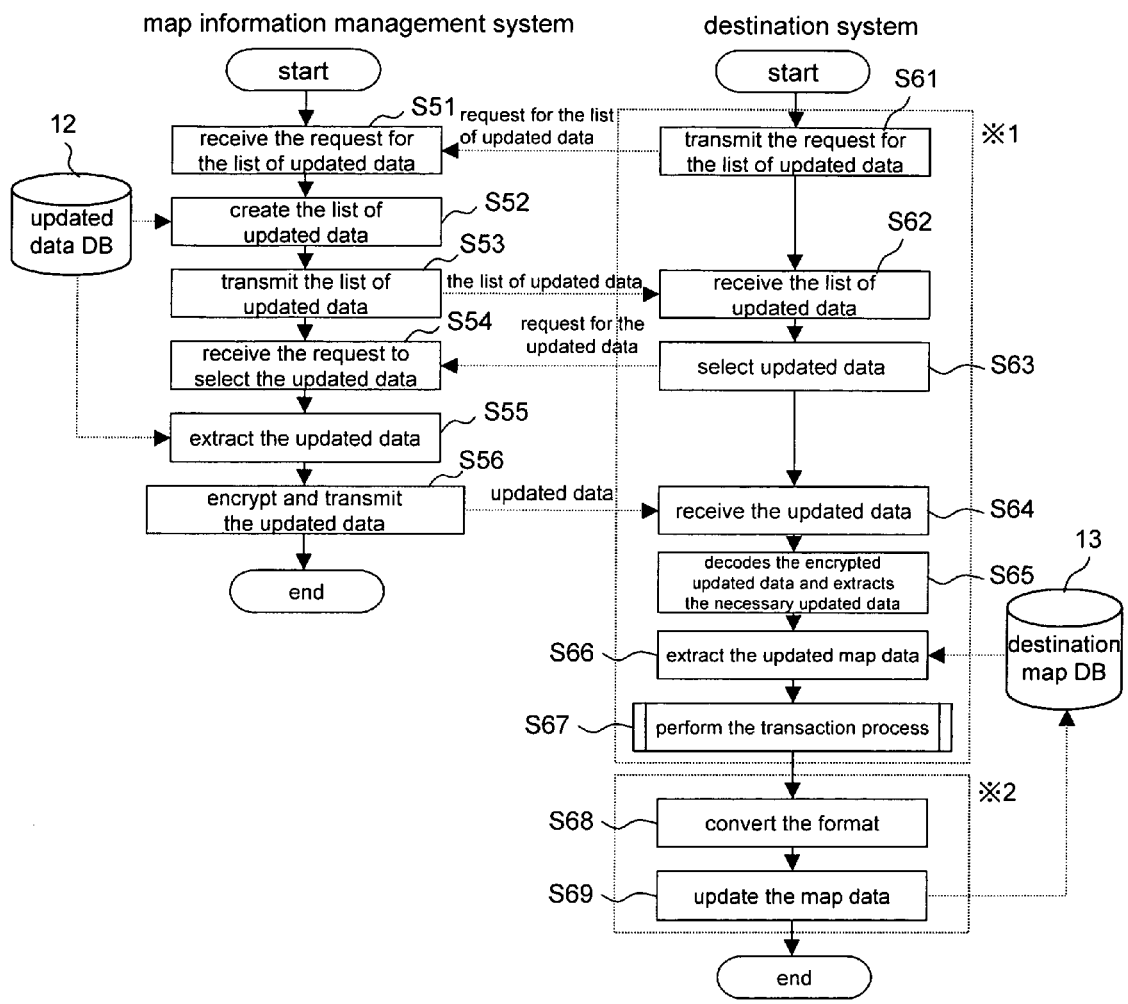
FIG. 9 is a flowchart showing an updated information distribution process of the map information distribution system according to the embodiment of the present invention.
Figure 10:
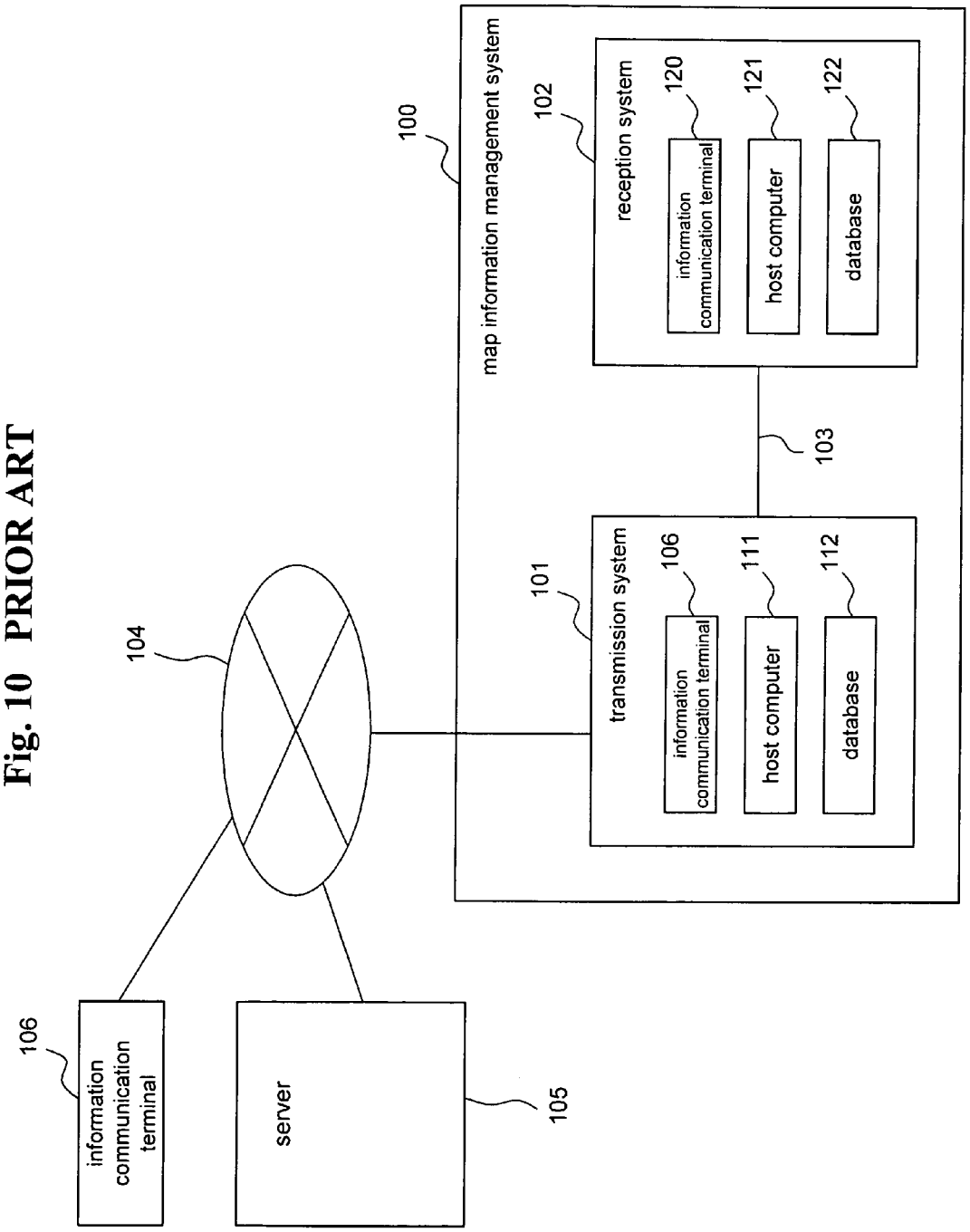
FIG. 10 is a view showing an overall arrangement of a map information distribution system disclosed in Patent Document 1.
Figure 11:
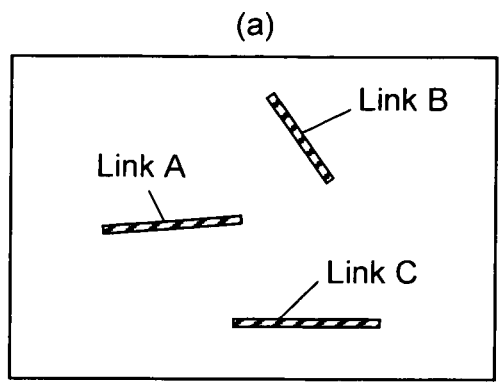
FIGS. 11(a), 11(b), and 11(c) are views showing an example of difference information.
Figure 11:
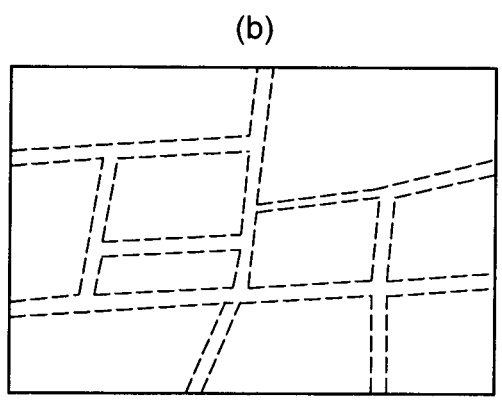
Figure 11:
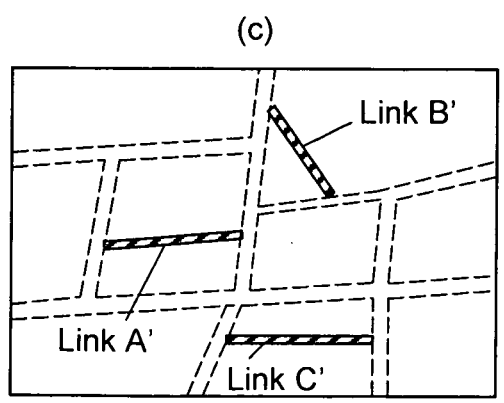

Next, an updated information distribution process will be explained. FIG. 9 is a flowchart showing the updated information distribution process of the map information distribution system 1 according to the embodiment 1 of the present invention.

First, at step S61, a user of the buyer side that manages the destination system 4 inputs an instruction for requesting to distribute a list of updated data through the input device 40. The list distribution request means 42 of the destination system 4 transmits a request for the list of updated data to the map information management system 2 in response to the instruction.

At step S51, the map information management system 2 receives the request for the list of updated data.

At step S52, the list creation means 23 creates the list of updated data (updated data list) referring to the updated data DB 12. At the time, the list creation means 23 obtains the revision number of the map data held by the destination system 4 at present referring to the distribution history DB14 and extracts the updated data corresponding to the map data of the revision number. Further, the list creation means 23 creates a list of remaining updated data by deleting the updated data that is already distributed referring to the distribution history DB 14.

At step S53, the list distribution means 24 transmits the list of updated data to the destination system 4. The list of updated data is transmitted after it is written by a markup language such as HTML language.

At step S62, the destination system 4 receives the list of updated data.

At step S63, the list presentation means 43 displays the received list of updated data on the display device 41 and prompts the user of the buyer side to select updated data in the list. The user of the buyer side selects particular updated data or all the updated data in the list using the input device 40. The distribution request means 44 transmits a request for the updated data including the ID of the updated data that is selected to the map information management system 2.

At step S54, the map information management system 2 receives the request for the updated data.

At step S55, the updated data extraction means 33 of the map information management system 2 reads out the updated data designated by the request for the updated data from the updated data DB 12.

At step S56, the updated data distribution means 34 encrypts the read-out updated data and transmits it to the destination system 4 from which the request is transmitted. Further, the updated data distribution means 34 records the ID of the destination system 4 to which the updated data is distributed, the distribution date, the ID of the updated data, and the like to the distribution history DB 14.

At step S64, the destination system 4 receives the updated data.

At step S65, the data extraction means 45 decodes the encrypted updated data. Then, the data extraction means 45 extracts the data (necessary updated data), which is needed by the buyer who manages the destination system 4 from the updated data. The necessary updated data is also stipulated by the license bought by the buyer likewise the necessary map data described above. The data extraction means 45 extracts the necessary updated data according to the license being set.

At step S66, the transaction process means 50 reads out the map data (or the object data) related to the necessary updated data from the destination map DB 13 when necessary.

Then, at step S67, the transaction process means 50 performs the transaction process by a transaction defined by the necessary updated data and updates an object.

At step S68, the format conversion means 51 converts the format of the updated map data into the original format used by the buyer.

Finally, at step S69, the map update means 52 stores the map data the format of which is converted in the destination map DB 13, updates the destination map data, and finishes the updated information distribution process.

Note that, as described above, the list distribution request means 42, the list presentation means 43, the distribution request means 44, and the data extraction means 45 are realized by causing the computer of the destination system 4 to read a program provided by the vender side, and the transaction process means 50, the format conversion means 51, and the map update means 52 are realized by causing the computer of the destination system 4 to read a program created by the buyer side and customized.

With this arrangement, a function for extracting necessary image data is managed on the vender side so that each vender can be provided with necessary information by extracting it through the computer of the destination system 4 according to the license bought by the vender. At the time, since the map data and the updated data is distributed after they are encrypted, the buyer side cannot arbitrarily extract a necessary function unless the license is not bought by the buyer side. Accordingly, the benefit of the vender side is not unfairly lost.

In contrast, since the transaction process and the format conversion process are performed by the program created by the buyer side, each buyer can promptly and easily perform a conversion into the original format of the buyer side. At the same time, since the load of the information process performed on the map information management system 2 side can be reduced by the amount of the transaction process and the format conversion process, even if a distribution request is transmitted from a plurality of destination systems 4 at the same time, the speed of the overall distribution process can be increased.

Industrial Applicability

The present invention can be utilized by the database of map information industries that manage and update map information.

The invention claimed is:

1. A map information management system comprising a computer connected to a destination system located in a destination and a map information update system located in a vender side to which map information is provided through a communication line for managing, updating, and distributing the map data, characterized by comprising:
    an updating map database for storing map data for update used to update and maintain map information;
    a difference information database for storing difference information for updating the map information;
    a providing map database for storing a providing map data that is distributed to the destination system;
    a map database update module for updating, when data is input to update the map data of the updating map database, the updating map in the updating map database;
    a difference information creation module for creating the differential data of the map data for update before and after updating is updated by the difference information and storing the differential data to the difference information database as difference information;
    a data distribution module for extracting, when the data distribution module receives a request to distribute difference information from the destination system, the difference information stored in the difference information database in response to the distribution request and distributes the difference information to the destination system;

an update execution module;

a data matching module that reads out the objects, which must be updated because the changed objects are updated, from the tentatively revised providing map data, and matching the read out objects in the tentatively revised providing map data so that the extracted difference information does not conflict with the providing map data, creating the revised providing map data, and storing the revised providing map data in the providing map database; and a map data for update revision module for revising the map data for update stored in the updating map database by the revised providing map data;

wherein the map data to be updated is replaced with revised map data all together at a predetermined time, wherein only the map data having been subjected to the matching step exist in the map to be updated;

wherein the update execution module reading the providing map stored in the providing map database and the difference information stored in the difference information database, change the objects in the providing map data based on the difference information, and create the tentatively revised providing map data.

2. The map information management system according to claim 1, characterized in that the difference information creation module comprises:

a differential data creation module for creating the differential data between the map data for update before and after updating is updated by the update data; and a transaction data creation module for creating transaction data for stipulating a transaction for updating the map data for update before updating is updated based on the differential data and storing the transaction data in the difference information database as difference information.

3. The map information management system according to claim 1, characterized in that the data distribution module distributes the providing map data or the difference information to the destination system after encrypting.

4. The map information management system according to claim 1, characterized by comprising:

a list creation module for obtaining the information of the map data held by the destination system, and creating a list of the difference information to the map data held by the destination system from the difference information stored in the difference information database; and a list distribution module for distributing the list of the difference information to the destination system in response to a request from the destination system, wherein when the data distribution module receives a request to distribute specific difference information in the list of the difference information from the destination system, the data distribution module extracts the difference information stored in the difference information database in response to the distribution request and distributes the difference information to the destination system.

5. The map information management system according to claim 1, comprising a program being executed by the computer to function as the map information system.

6. A map information distribution system comprising a first computer, which updates, manages, and distributes map information, is connected to a destination system comprising a second computer as a destination to which the map information is provided and a map information update system comprising a third computer through a network, characterized by comprising:

an updating map database for storing map data for update used to update and maintain map information;

a difference information database for storing difference information for updating the map information;

a providing map database for storing a providing map data that is distributed to the destination system:

a map database update module for updating, when data is input to update the map data of the updating map database from the map information update system, the updating map in the updating map database;

a difference information creation module for creating the differential data of the map data for update before and after updating is updated by the difference information and storing the differential data to the difference information database as difference information;

a data distribution module for extracting, when the data distribution module receives a request to distribute difference information from the destination system, the difference information stored in the difference information database in response to the distribution request and distributes the difference information to the destination system;

an update execution module for reading the providing map stored in the providing map database and the difference information stored in the difference information database, changing the objects in the providing map data based on the difference information, and creating the tentatively revised providing map data;

a data matching module that reads out the objects, which must be updated because the changed objects are updated, from the tentatively revised providing map data, and matching the read out objects in the tentatively revised providing map data so that the extracted difference information does not conflict with the providing map data, creating the revised providing map data, and storing the revised providing map data in the providing map database; and a map data for update revision module for revising the map data for update stored in the updating map database by the revised providing map data, wherein the map data to be updated is replaced with revised map data all together at a predetermined time, wherein only the map data having been subjected to the matching step exist in the map to be updated;

wherein the destination system comprises:

a destination map database for storing destination map data used in the destination system;

a distribution request module for transmitting a request to distribute difference information to the map information management system;

a format conversion module for converting, when the format conversion module receives the difference information from the map information management system, object data created based on the difference information into a format used in the destination system; and a map update module for updating the destination map data of the providing map database based on the object data the format of which is converted by the format conversion module.

7. The map information distribution system according to claim 6, characterized in that the destination system comprises:

a data extraction module for extracting, when the data extraction module receives the difference information from the map information management system, the necessary difference information on a part of the difference information that is needed by the destination system from the data; and a map update module for updating the destination map data of the destination map database based on the necessary difference information extracted by the data extraction module, wherein the format conversion module converts the object data created based on the necessary difference information extracted by the data extraction module into a format used in the destination system.

8. The map information distribution system according to claim 6, characterized in that the difference information creation module of the map information management system comprises:

a differential data creation module for creating the differential data between the map data for update before and after updating is updated by the update data; and a transaction data creation module for creating transaction data for stipulating a transaction for updating the map data based on the differential data and storing the transaction data in the difference information database as difference information, wherein the data update module of the destination system comprises transaction process module for performing the transaction process which is stipulated by the transaction data that is the necessary difference information extracted by the data extraction module referring to the destination map data of the destination map data base and creating object data for updating the destination map data.

9. The map information distribution system according to claim 6, characterized in that:

the data distribution module of the map information management system distributes the difference information to the destination system by encrypting the difference information ; and when the data extraction module of the destination system receives the encrypted difference information from the map information management system, the data extraction module decodes the data as well as extracts the necessary difference information needed by the destination system.

10. The map information distribution system according to claim 6 characterized in that the map information management system comprises:

a list creation module for creating a list of the difference information stored in the difference information database; and a list distribution module for distributing the list of the difference information to the destination system in response to a request to distribute the list from the destination system, wherein when the data distribution module receives a request to distribute specific difference information in the list of the difference information from the destination system, the data distribution module extracts the difference information stored in the difference information database in response to the distribution request and distributes the difference information to the destination system, and the destination system comprises:

a list distribution request module for transmitting a request to distribute the list to the map information management system; and a list presentation module for displaying the list on a display device when the list presentation module receives the list of the difference information from the map information management system and prompting a user to select difference information in the list, wherein when the user selects the specific difference information in the list, the distribution request module transmits a request to distribute the specific difference information to the map information management system.

11. The map information management system according to claim 1, wherein:

an object constitutes one of the group consisting of a link, a node, a polygon, and an image of a planimetric feature;

the data matching module matches a portion of an object in a second map tile to a portion of the object in a first map tile; and the update execution module changes a portion of an object in a second map based on the difference information.

12. The map information management system according to claim 6, wherein:

an object constitutes one of the group consisting of a link, a node, a polygon, and an image of a planimetric feature;

the data matching module matches a portion of an object in a second map tile to a portion of the object in a first map tile; and the update execution module changes a portion of an object in a second map based on the difference information.

13. The map information management system according to claim 1, wherein a program is embodied in a non-transitory computer-readable medium comprising steps executed by the computer.

14. The map information management system according to claim 1, wherein the providing map data is separated from the updating map data, and when the map data to be updated is updated, an updated-data tag of only the data to be updated is created and distributed, whereby it is not necessary to stop the distribution of the map information even while the map data to be updated is updated, and a vender on the destination system side can obtain the latest map data at all times.

15. The map information distribution system according to claim 6, wherein the providing map data is separated from the updating map data, and when the map data to be updated is updated, an updated-data tag of only the data to be updated is created and distributed, whereby it is not necessary to stop the distribution of the map information even while the map data to be updated is updated, and a vender on the destination system side can obtain the latest map data at all times.

* * * * *